(12) United States Patent
Dziecielski et al.

(10) Patent No.: US 12,354,037 B2
(45) Date of Patent: Jul. 8, 2025

(54) SYSTEM FOR DETERMINING AIRCRAFT TURNAROUND TIME BASED ON GEOSPATIAL DATA AND AIRCRAFT LOCATION DATA

(71) Applicant: The Boeing Company, Chicago, IL (US)

(72) Inventors: Jakub Dziecielski, Gdansk (PL); Andrea Sanzone, Frankfurt (DE); Rowena Loh, Singapore (SG); Rahul Ashok, Singapore (SG); Garoe Gonzalez, Frankfurt (DE)

(73) Assignee: The Boeing Company, Arlington, VA (US)

(*) Notice: Subject to any disclaimer, the term of this patent is extended or adjusted under 35 U.S.C. 154(b) by 814 days.

(21) Appl. No.: 17/498,994

(22) Filed: Oct. 12, 2021

(65) Prior Publication Data
US 2022/0114898 A1     Apr. 14, 2022

Related U.S. Application Data

(60) Provisional application No. 63/091,607, filed on Oct. 14, 2020.

(51) Int. Cl.
*G06Q 10/0631*     (2023.01)
(52) U.S. Cl.
CPC ................ *G06Q 10/0631* (2013.01)
(58) Field of Classification Search
None
See application file for complete search history.

(56) References Cited

U.S. PATENT DOCUMENTS

| | | | |
|---|---|---|---|
| 2018/0016034 A1* | 1/2018 | Joyson | G06Q 10/0633 |
| 2018/0229856 A1* | 8/2018 | Agrawal | G06Q 10/10 |
| 2018/0373246 A1* | 12/2018 | Laughlin | G06Q 10/08 |
| 2020/0377232 A1 | 12/2020 | Gonzalez Parra et al. | |

FOREIGN PATENT DOCUMENTS

CA     2814317 A1 * 10/2013     ............ B64F 1/002

OTHER PUBLICATIONS

Yichen Qin et. al., "Aircraft parking stand allocation problem with safety consideration for independent hangar maintenance service providers," 2018, Computers and Operations Research 91, pp. 225-236 (Year: 2018).*

* cited by examiner

*Primary Examiner* — Amanda Gurski
(74) *Attorney, Agent, or Firm* — Kolitch Romano Dascenzo Gates LLC (57) ABSTRACT

A system for determining a turnaround time for an aircraft at an airport includes one or more processors, one or more geospatial databases storing geospatial data, and a memory coupled to the one or more processors and the one or more geospatial databases. The memory stores data into a database and program code that, when executed by the one or more processors, causes the system to monitor a wireless data stream indicating aircraft location data. In response to determining the aircraft is idle and is located within an area where a unique parking stand is located, the system establishes a current position timestamp as an on-block time. In response to determining the aircraft is moving out of the unique parking stand, the system determines a position timestamp when the aircraft was last idle, and sets the position timestamp collected when the aircraft was last idle as an off-block time.

20 Claims, 8 Drawing Sheets

SYSTEM FOR DETERMINING AIRCRAFT TURNAROUND TIME BASED ON GEOSPATIAL DATA AND AIRCRAFT LOCATION DATA

CROSS-REFERENCE TO RELATED APPLICATION

This application claims priority to U.S. Provisional Application No. 63/091,607, filed Oct. 14, 2020. The contents of the application are incorporated herein by reference in its entirety.

INTRODUCTION

The present disclosure relates to a system and method for determining a turnaround time of an aircraft in real-time. More specifically, the present disclosure is directed towards a system and method for determining the turnaround time of an aircraft based on geospatial data and aircraft location data.

BACKGROUND

Aircraft turnaround operations refer to the various tasks conducted when preparing an inbound aircraft at an airport for a subsequent outbound flight. Some of the tasks performed during an aircraft turnaround may include, but are not limited to, passenger deboarding and boarding, cleaning, baggage loading and unloading, catering replenishment, and fueling. The turnaround time refers to the amount of time that elapses from the time the inbound aircraft lands and enters a parking stand, which is referred to as an on-block time, until the time the aircraft exits the parking stand takes off for the outbound flight, which is referred to as the off-block time.

There are several approaches currently available for monitoring the turnaround time of an aircraft. For example, in one commonly used approach, the aircraft communication system may transmit automatic radio messages indicating either the on-block time or the off-block time is commencing. Specifically, for example, the aircraft communication system may transmit radio messages when the aircraft's parking brakes are applied, which indicate the start of the on-block time. The aircraft communication system may also transmit messages to indicate off-block events such as, for example, when the aircraft's doors close or when the parking brakes are released. However, this approach may have some drawbacks. First, the aircraft communication system has to be explicitly configured in advance to distribute the radio messages. As a result, sometimes each aircraft that is part of an airline's fleet may need to be individually configured. Moreover, the radio messages transmitted by the aircraft communication system may not provide information regarding the particular parking stand that was employed for the given turnaround operation. Finally, the off-block times derived based on this radio message approach tend to underestimate the actual or real turnaround time, since an aircraft usually stands idle for some time after closing the doors or releasing the parking brakes.

In another approach to monitor the turnaround time, every parking stand in an airport may be equipped with a camera. In this approach, each camera is connected to a computing device having image recognition capabilities for determining the presence of an aircraft in the parking stand. This image recognition based approach may result in improved accuracy when compared to the above-mentioned approach involving transmitting radio messages. However, the image recognition based approach may be costly, as an airport will have to equip each and every existing parking stand with a camera. Furthermore, sometimes there are numerous remote parking stands located far away from the terminal, thereby making it cumbersome to equip each parking stand with its own camera. An additional data source is also required when employing this approach to identify the tail number and flight code of the aircraft. Finally, both above-mentioned approaches for determining the turnaround do not provide wide and easy access to competitor data.

SUMMARY

According to several aspects, a system for determining a turnaround time for an aircraft at an airport is disclosed. The system includes one or more processors, one or more geospatial databases storing geospatial data, and a memory coupled to the one or more processors and the one or more geospatial databases. The geospatial data includes a plurality of spatial measurement sets that correspond to the airport where the aircraft is performing a turnaround, where each spatial measurement set indicates an area occupied by a corresponding parking stand. The memory stores data into a database and program code that, when executed by the one or more processors, causes the system to monitor a wireless data stream indicating aircraft location data. The aircraft location data includes at least a current position, a current altitude, a current velocity, and a current position timestamp of the aircraft. The system is further caused to determine the aircraft is commencing the turnaround and is approaching a unique parking stand at the airport based on the geospatial data and the aircraft location data, where the unique parking stand is where the turnaround occurs. After determining the turnaround has commenced, the system determines the aircraft is idle based on the current position and the current velocity of the aircraft and the aircraft is located within the unique parking stand based on the geospatial data and the aircraft location data. In response to determining the aircraft is idle and is located within the area where the unique parking stand is located, the system establishes a current position timestamp as an on-block time of the turnaround. After determining the on-block time, the system determines the aircraft is moving out of the unique parking stand based on the geospatial data and the aircraft location data. In response to determining the aircraft is moving out of the unique parking stand, the system determines a position timestamp when the aircraft was last idle. The system then sets the position timestamp collected when the aircraft was last idle as an off-block time of the turnaround.

In another aspect, a method for determining a turnaround time of an aircraft at an airport is disclosed. The method includes monitoring, by a computing device, a wireless data stream indicating aircraft location data. The aircraft location data includes at least a current position, a current altitude, a current velocity, and a current position timestamp of the aircraft. The method includes determining, by the computing device, the aircraft is commencing a turnaround and is approaching a unique parking stand at the airport based on geospatial data and the aircraft location data. The unique parking stand is where the turnaround occurs, the geospatial data includes a plurality of spatial measurement sets that correspond to the airport where the aircraft is performing the turnaround, and each spatial measurement set indicates an area occupied by a corresponding parking stand. The method also includes determining the aircraft is idle based on the current position and the current velocity of the aircraft and the aircraft is located within the unique parking stand based on the geospatial data and the aircraft location data. In response to determining the aircraft is idle and is located within the area where the unique parking stand is located, the method includes establishing a current position timestamp as an on-block time of the turnaround. After determining the on-block time, the method includes determining the aircraft is moving out of the unique parking stand based on the geospatial data and the aircraft location data. In response to determining the aircraft is moving out of the unique parking stand, the method includes determining a position timestamp when the aircraft was last idle. The method includes setting the position timestamp collected when the aircraft was last idle as an off-block time of the turnaround. Finally, the method includes determining the turnaround time based on the on-block time and the off-block time.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards a system for determining a turnaround time of an aircraft in real-time based on geospatial data and aircraft location data. Specifically, the disclosed system includes a computing device that receives a wireless data stream that indicates the aircraft location data. In one embodiment, the wireless data stream is transmitted by the aircraft. Alternatively, in another embodiment, the wireless data stream is transmitted by a multilateration system. The aircraft location data includes at least a current position, a current altitude, a current velocity, and a current position timestamp of the aircraft. The disclosed system also includes one or more geospatial databases that store the geospatial data. The geospatial data includes a plurality of spatial measurement sets that correspond to the airport where the aircraft is performing a turnaround, where each spatial measurement set indicates an area occupied by a corresponding parking stand. The system is configured to determine an on-block time and an off-block time based on the geospatial data and the aircraft location data, where the turnaround time is the amount of time that elapses between the on-block time and the off-block time.

In one embodiment, the system includes one or more historical computational databases that store turnaround records. The system aggregates the turnaround records based on an airport code, a specific parking stand where a turnaround took place, and an aircraft type. In one embodiment, the disclosed system analyzes the historical data stored in the historical computational database to determine information such as, for example, the efficiency of the turnarounds that are performed with a specific aircraft type at a specific parking stand. In another embodiment, the system includes a notification system configured to generate one or more indicators. The one or more indicators inform individuals when an on-going turnaround performed by the aircraft exceeds a target or maximum amount of time that the aircraft takes when performing a turnaround.

The following description is merely exemplary in nature and is not intended to limit the present disclosure, application, or uses.

Figure 1A:
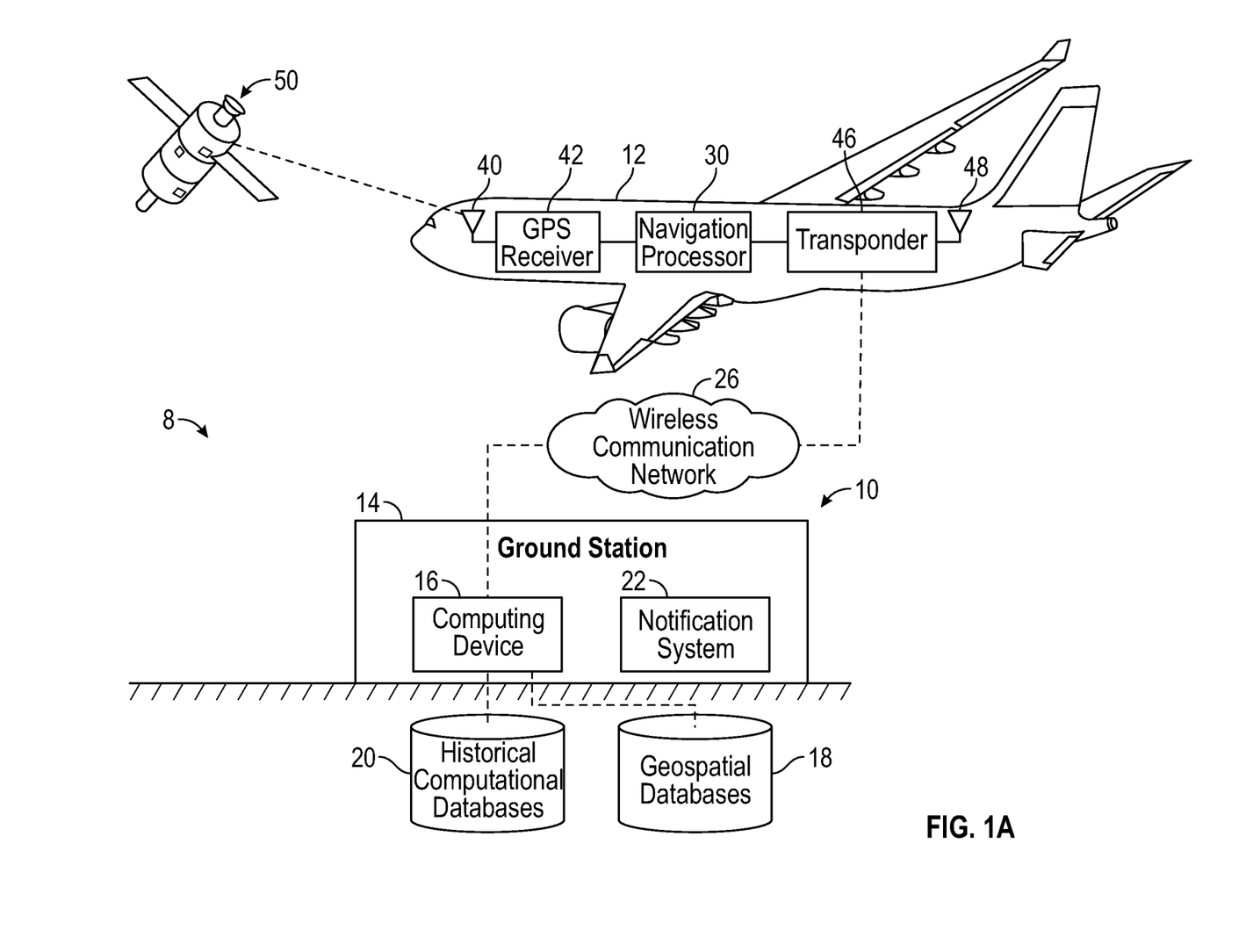
FIG. 1A is a schematic diagram of the disclosed system for determining a turnaround time for an aircraft, where the system obtains aircraft location data from wireless data streams transmitted by the aircraft, according to an exemplary embodiment.

Referring to FIG. 1A, an exemplary system 10 that determines a turnaround time of an aircraft 12 at an airport 8 is illustrated. The system 10 includes a ground station 14 including a computing device 16, one or more geospatial databases 18, one or more historical computational databases 20, and a notification system 22. The one or more geospatial databases 18 are configured to store geospatial data. The geospatial data includes a plurality of spatial measurement sets that correspond to the airport 8 where the aircraft 12 is performing the turnaround. Each spatial measurement set indicates an area A occupied by a corresponding parking stand 24 at the airport 8 (seen in FIG. 2). In the embodiment as shown in FIG. 1A, the computing device 16 is in wireless communication with a transponder antenna 48 of the aircraft 12 over a wireless communication network 26. The aircraft 12 includes a navigation processor 30 determining aircraft location data that corresponds to the aircraft 12. The aircraft location data is sent to the computing device 16 over the wireless communication network 26. In the alternative embodiment as shown in FIG. 1B, instead of receiving the aircraft location data from the aircraft 12, the computing device 16 of the ground station receives the aircraft location data from a multilateration system 28.

Figure 1B:
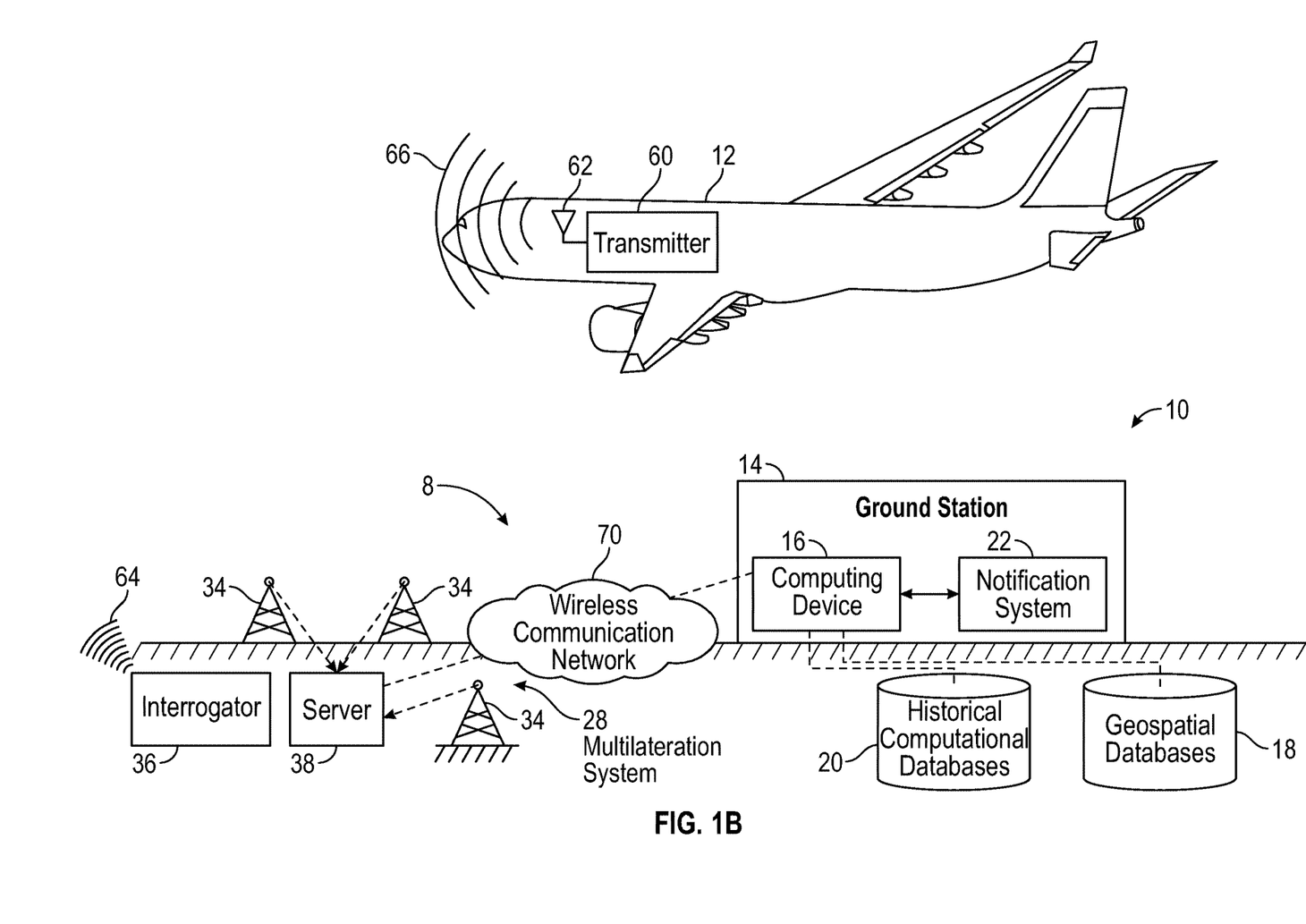
FIG. 1B is an alternative embodiment of the system shown in FIG. 1A, where the system obtains the aircraft location data from a multilateration system, according to an exemplary embodiment.

Referring to both FIGS. 1A and 1B, the computing device 16 is configured to determine a turnaround time of the aircraft 12 based on the geospatial data stored in the one or more geospatial databases 18 and the aircraft location data received either from the aircraft 12 (FIG. 1A) or the multilateration system 28 (FIG. 1B). The turnaround time is an amount of time that elapses from when the aircraft 12 lands and enters a corresponding one of the parking stands 24 (FIG. 2), which is referred to as an on-block time, until the time when the aircraft 12 exits the corresponding parking stand 24, and takes off for an outbound flight, which is referred to as the off-block time.

Referring to FIG. 1A, the aircraft 12 transmits the aircraft location data to the computing device 16 over the wireless communication network 26. In the non-limiting embodiment as shown in FIG. 1A, the aircraft 12 includes a global positioning system (GPS) antenna 40 in electronic communication with a GPS receiver 42, the navigation processor 30, a transponder 46, and the transponder antenna 48. The GPS antenna 40 is in wireless communication with a global navigation satellite system (GNSS) 50 that transmits positioning, navigation, and timing (PNT) data. The navigation processor 30 of the aircraft 12 determines the aircraft location data based on the PNT data, and sends data indicating the aircraft location data to the transponder 46. The transponder 46 is configured to periodically broadcast a wireless data streams over the wireless communication network 26, where the wireless data stream indicates the aircraft location data.

The aircraft location data includes at least a current position, a current altitude, a current velocity, and a current position timestamp of the aircraft 12. In an embodiment, the current position of the aircraft 12 includes latitude and longitude coordinates. Although the current position, current altitude, and current velocity are described, it is to be appreciated that the aircraft location data may include other information pertaining to the aircraft 12 as well. For example, in one embodiment, the transponder 46 of the aircraft 12 may transmit automatic dependent surveillance-broadcast (ADS-B) out signals. In the present example, the aircraft location data transmitted by the ADS-B signals further includes a current flight identifier of the aircraft 12 as well as information used to derive an origin airport code of the aircraft 12, a destination airport code of the aircraft 12, a tail number of the aircraft 12, and an aircraft model of the aircraft 12. It is to be appreciated that the wireless data streams are not limited to ADS-B out signals. Instead, other types of wireless data streams may be used as well such as, for example, radar signals.

In the embodiment as shown in FIG. 1B, the system 10 employs multilateration to determine the aircraft location data. It is to be appreciated that multilateration determines the current position, the current altitude, the current velocity, and the current position timestamps of the aircraft 12, however, other information used to derive information such as the origin airport code or the destination airport code is not available. FIG. 1B illustrates the multilateration system 28 including three or more ground antennas 34, an interrogator 36, and a server 38, where the three or more ground antennas 34 are positioned around the airport 8 in unique locations. The aircraft 12 includes a transmitter 60 in electronic communication with a transmitter antenna 62. The interrogator 36 of the multilateration system 28 transmits interrogatory signals 64 configured to induce signal transmittance from the transmitter 60 in the aircraft 12. Specifically, the transmitter 60 generates reply signals 66 that are received by the ground antennas 34 in response to receiving the interrogatory signals 64 transmitted by the interrogator 36. Since the ground antennas 34 that are part of the multilateration system 28 are positioned in unique locations around the airport 8, the reply signals 66 are received by each ground antenna 34 at fractionally different times. The ground antennas 34 send the reply signals 66 to the server 38, and the server 38 derives the aircraft location data by calculating a time difference of arrival (TDOA) between each of the reply signals 66. The server 38 is configured to send the wireless data stream indicating the aircraft location data over a wireless communication network 70 to the computing device 16.

Figure 2:
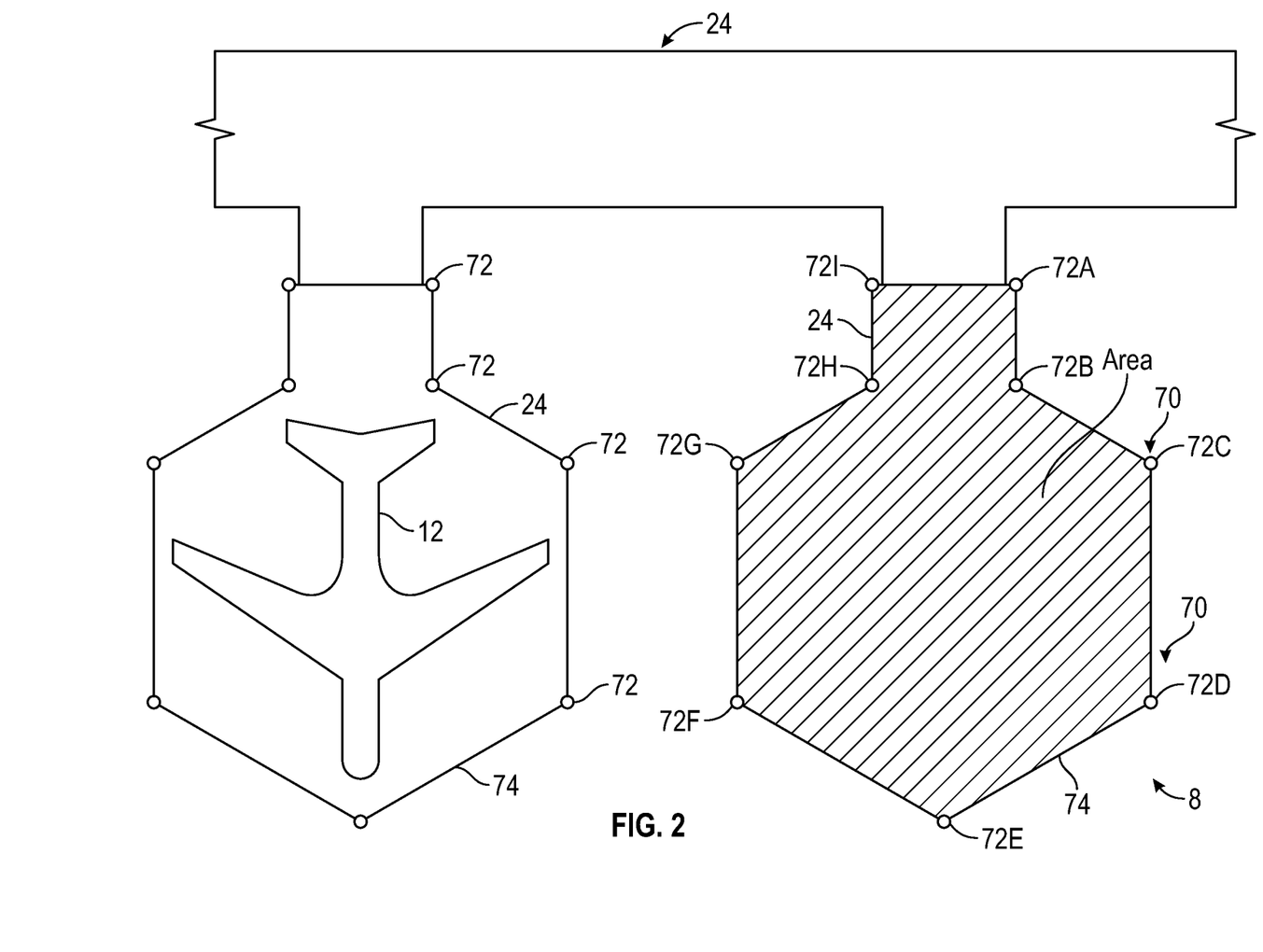
FIG. 2 is a schematic diagram of a plurality of parking stands at an airport terminal, according to an exemplary embodiment.

Referring to both FIGS. 1A and 1B, the geospatial data stored by the one or more geospatial databases 18 includes the plurality of spatial measurement sets corresponding to the airport 8 where the aircraft 12 is performing a turnaround. Turning now to FIG. 2, each spatial measurement set indicates the area A occupied by a corresponding parking stand 24 of the airport 8. As seen in FIG. 2, the spatial measurement set corresponding to each parking stand 24 includes a plurality of points 72, where each point 72 indicates a unique latitude and longitude. The points 72 cooperate to define a polygon 74, where the polygon 74 encompasses the area A occupied by the corresponding parking stand 24 of the airport 8. For example, in the embodiment as shown in FIG. 2, the parking stand 24 located on the right hand side includes nine points, 72A-721, where the points 72 are connected to one another to create the polygon 74. As explained below, the system 10 (FIGS. 1A and 1B) determines the amount of time that passes from when the aircraft 12 lands and enters a corresponding one of the parking stands 24 until the time when the aircraft 12 exits the corresponding parking stand 24, which is the turnaround time.

Turning back to FIGS. 1A and 1B, the notification system 22 is in electronic communication with the computing device 16 of the system 10. The notification system 22 is any device for generating one or more indicators, where the one or more indicators are configured to inform individuals when an on-going turnaround performed by the aircraft 12 exceeds a threshold period of time. The threshold period of time represents a target or maximum amount of time that the aircraft 12 is allotted when performing a turnaround. For example, in one embodiment, the threshold period of time is determined based on the turnaround time of one or more competitor airlines. In other words, the indicator generated by the notification system 22 informs individuals when an on-going turnaround might be taking too long to complete when compared to a predefined metric. In an embodiment, the system 10 first determines the on-block time has commenced. Once the system 10 determines the on-block time has commenced, the system 10 then monitors the time that elapses until the off-block time commences. The system 10 generates the indicator in response to determining the threshold period time has elapsed, but the off-block time has not commenced.

The notification system 22 generates a graphic, tactile, or audio-based indicator. In one embodiment, the notification system 22 is a display device that generates visual indicators such as graphics or text for informing individuals when an on-going turnaround exceeds the threshold period of time. Some examples of display devices include liquid crystal displays (LCDs) and light emitting diode displays (LED displays). Alternatively, in another embodiment, the notification system 22 includes a speaker for generating audio indicators to inform individuals that when an on-going turnaround exceeds the threshold period of time.

Continuing to refer to FIGS. 1A and 1B, in an embodiment the system 10 generates a turnaround record in response to determining the turnaround time. The one or more historical computational databases 20 store a plurality of turnaround records. Each turnaround record indicates the turnaround time for a particular turnaround. In one embodiment, the turnaround records also includes one or more of the following: airline information, a flight number associated with the turnaround, an aircraft type, an aircraft registration, an airport code where the turnaround occurred, and the specific parking stand where the turnaround occurred. The historical computational databases 20 stores the turnaround records, and aggregates them based on the airport code, the specific parking stand where the turnaround took place, and the aircraft type. In one embodiment, the system 10 then analyzes the historical data stored in the historical computational database 20 to determine the efficiency of the turnarounds that are performed with a specific aircraft type at a specific parking stand 24 at the airport 8. In one non-limiting embodiment, the system 10 compares the turnaround time of a specific airline's fleet with the fleet of one or more competing airlines.

Figure 3A:
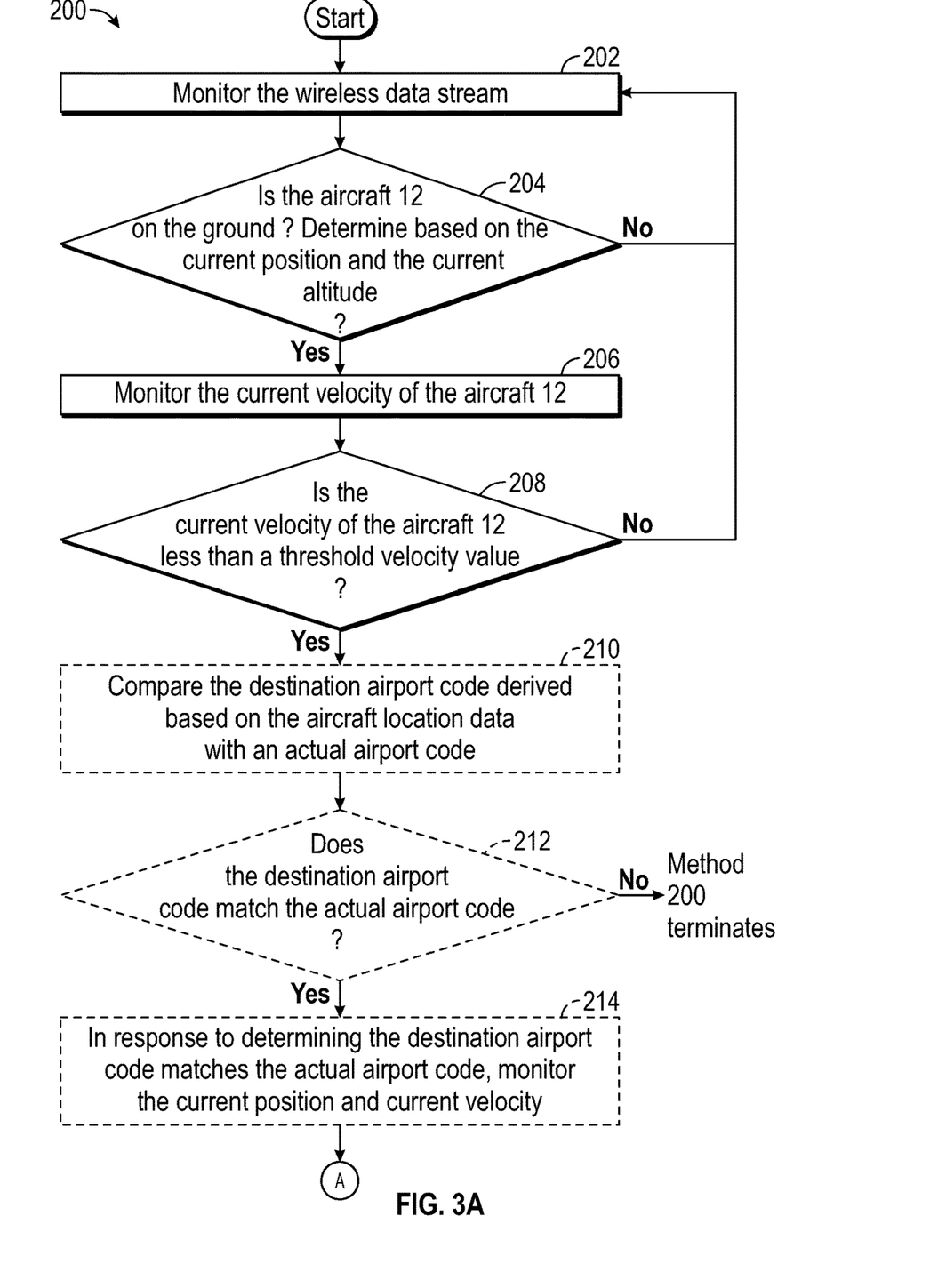
FIGS. 3A-3D illustrate a process flow diagram illustrating a method for determining the turnaround time of an aircraft, according to an exemplary embodiment.

FIGS. 3A, 3B, 3C, and 3D illustrate an exemplary process flow diagram illustrating a method 200 for determining the turnaround time of the aircraft 12. Referring to FIGS. 1A, 1B, and 3A, the method 200 begins at block 202. In block 202, the computing device 16 of the ground station 14 monitors the wireless data stream. As mentioned above, the wireless data stream is sent either from the transponder 46 of the aircraft 12 (seen in FIG. 1A) or, alternatively, by the server 38 of the multilateration system 28 (seen in FIG. 1B). The wireless data stream includes the aircraft location data, where the aircraft location data includes at least the current position, the current altitude, the current velocity, and the current position timestamp of the aircraft 12. However, in another embodiment, the aircraft location data includes one or more of the following: the flight identifier, the origin airport code of the aircraft 12, and the destination airport code of the aircraft 12. The method 200 may then proceed to block 204.

In block 204, the computing device 16 determines if the aircraft 12 is on ground based on the current position and the current altitude of the aircraft 12 from the aircraft location data. If the computing device 16 determines the aircraft 12 is not on the ground, the then method 200 returns to block 202, and the computing device 16 continues to monitor the wireless data stream. However, in response to determining the aircraft 12 is on the ground, then the method 200 proceeds to block 206.

In block 206, the computing device 16 monitors the current velocity of the aircraft 12, and the method 200 then proceeds to block 208.

In block 208, the computing device 16 determines if the current velocity of the aircraft 12 is less than a threshold velocity value. The threshold velocity value indicates the aircraft 12 is coming to a stop. For example, in one non-limiting embodiment, the threshold velocity value is about twenty-five knots. In response to determining the current velocity value is not less than the threshold velocity value, the method proceeds back to block 202, and the computing device 16 continues to monitor the wireless data stream. However, in response to determining the current velocity value is less than the threshold velocity value, the method 200 proceeds to block 210.

It is to be appreciated that blocks 210, 212, and 214 are optional, and may only be performed when the aircraft location data includes information that is used to derive the aircraft destination code. In block 210, the computing device 16 compares the destination airport code of the aircraft 12 derived using the aircraft location data with an actual airport code. The actual airport code represents the real airport code where the aircraft 12 is located. The method 200 may then proceed to block 212.

In block 212, the computing device 16 determines if the destination airport code matches the actual airport code. If the destination airport code derived based on the aircraft location data does not match the actual airport code, then the method 200 may then terminate. However, if the destination airport code derived based on the aircraft location data matches the actual airport code, then the method 200 may proceed to block 214.

In block 214, in response to determining the destination airport code matches the actual airport code, the computing device 16 monitors the current position the current velocity of the aircraft 12. The method 200 then proceeds to block 216.

Figure 3B:
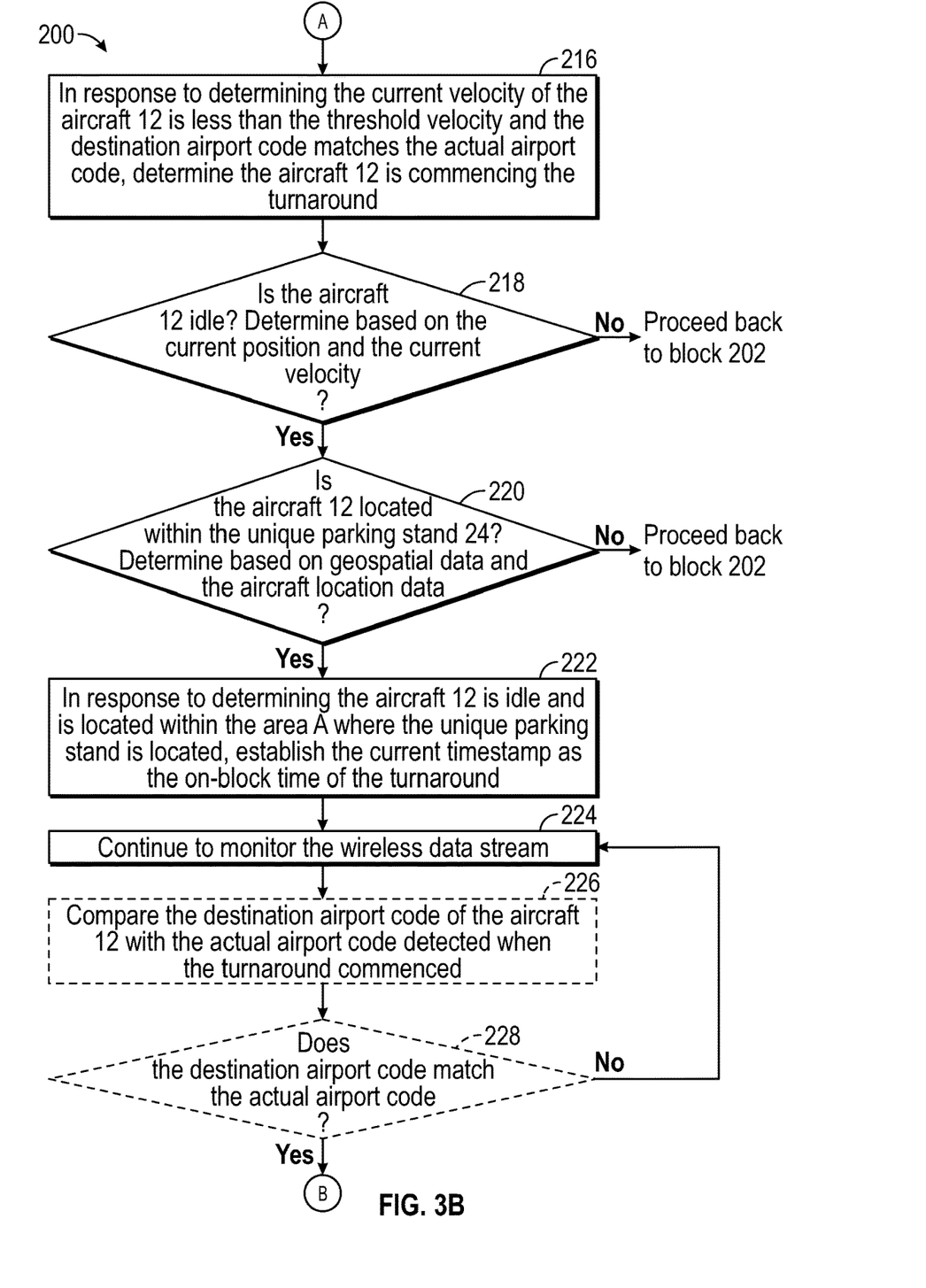

Referring to FIG. 3B, in block 216, in response to determining the current velocity of the aircraft 12 is less than the threshold velocity value and the destination airport code matches the actual airport code, the computing device 16 determines the aircraft 12 is commencing the turnaround. Specifically, the computing device 16 determines the aircraft 12 is commencing the turnaround and is approaching a unique parking stand at the airport 8 based on the geospatial data stored in the one or more geospatial databases 18 and the aircraft location data, where the unique parking stand is where the turnaround occurs. For example, referring to FIG. 2, the aircraft 12 performs the turnaround in the unique parking stand 24A.

In one embodiment, before determining the aircraft 12 is commencing the turnaround, the computing device 16 checks a value of the flight identifier to ensure that the wireless data stream is not being transmitted by a ground vehicle such as an automobile or bus or, alternatively, by a private or non-commercial aircraft. The method 200 may then proceed to block 218.

In block 218, after determining the turnaround has commenced, the computing device 16 determines if the aircraft is idle based on the current position and the current velocity of the aircraft 12. In an embodiment, after determining the aircraft 12 is idle, the computing device 16 also determines if the last position of the aircraft 12 immediately before the aircraft 12 idled indicated movement. If the aircraft 12 is not idle, then the method 200 proceeds back to block 202. However, in response to determining the aircraft is idle, the method 200 proceeds to block 220.

In block 220, the computing device 16 determines if the aircraft is located within the unique parking stand 24 based on the geospatial data and the aircraft location data. If the aircraft 12 is not located within the unique parking stand 24, then the method 200 may proceed back to block 202. However, in response to determining the aircraft 12 is idle and is located within the area A where the unique parking stand 24 is located, the method 200 proceeds to block 222.

In block 222, in response to determining the aircraft 12 is idle and is located within the area A where the unique parking stand 24 is located, the computing device 16 establishing the current position timestamp from the aircraft location data as the on-block time of the turnaround. The method 200 then proceeds to block 224.

In block 224, the computing device 16 continues to monitor the wireless data stream. The method 200 may then proceed to block 226.

Blocks 226, 228, 230, 232, 234, 236, 238, 240, 242, 244, and 246 are optional. In block 226, the computing device 16 compare the destination airport code of the aircraft 12 derived based on the aircraft location data with the actual airport code of the aircraft that was detected when the turnaround commenced. The method 200 may then proceed to block 228.

In block 228, if the computing device 16 determines the destination airport code of the aircraft 12 does not match the actual airport code of the aircraft that was detected when the turnaround commenced, then the method 200 returns to block 224. However, if the computing device 16 determines the destination airport code of the aircraft 12 matches the actual airport code of the aircraft that was detected when the turnaround commenced, then the method 200 proceeds to block 230.

Figure 3C:
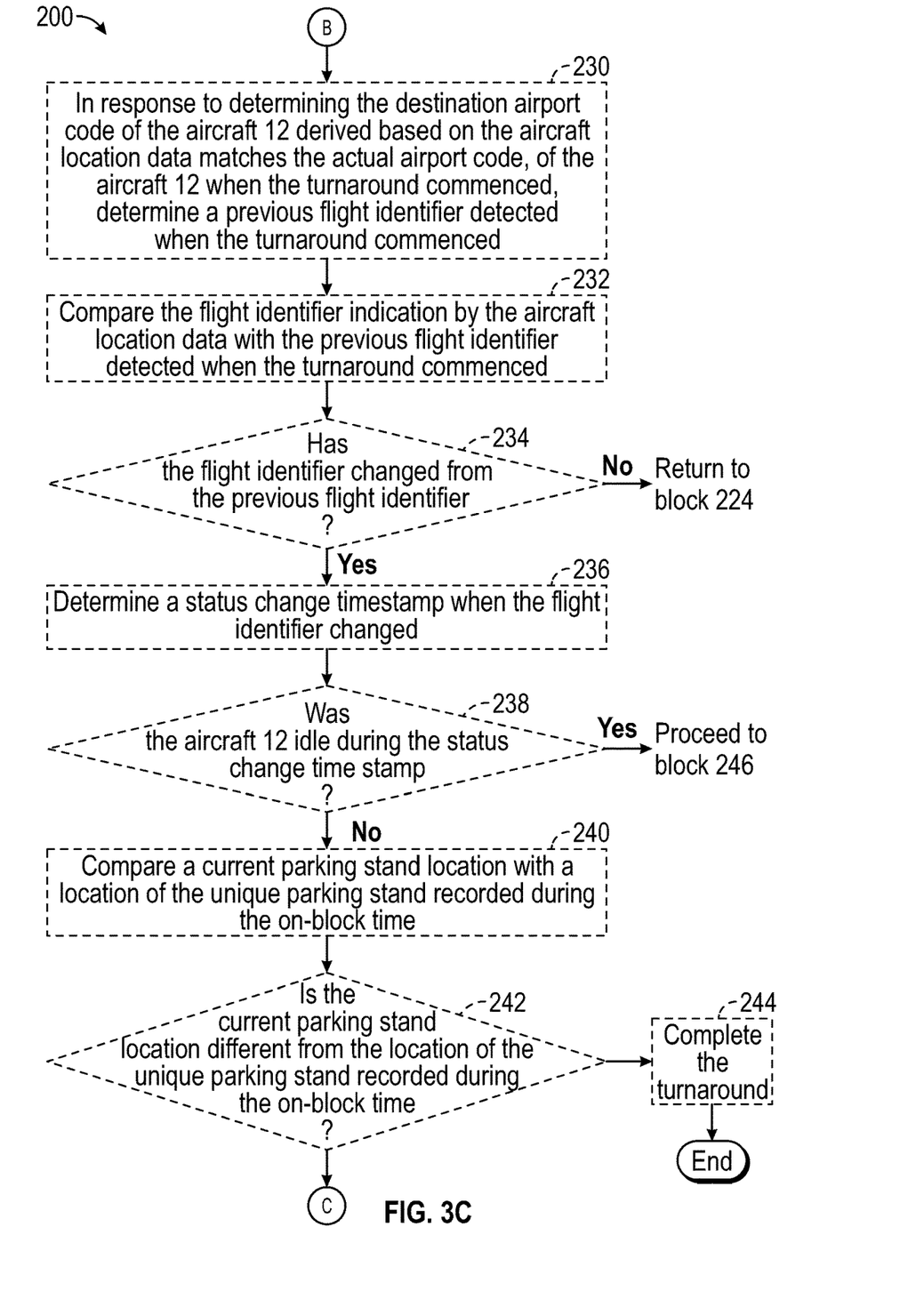

Referring to FIG. 3C, in block 230, in response to determining the destination airport code of the aircraft 12 derived based on the aircraft location data matches the actual airport code of the aircraft when the turnaround commenced, the computing device 16 determines a previous flight identifier that was detected when the turnaround commenced. The method 200 may then proceed to block 232.

In block 232, the computing device 16 compares the flight identifier indicated by the aircraft location data with the previous flight identifier detected when the turnaround commenced. The method 200 may then proceed to block 234.

In block 234, the computing device 16 determines if the flight identifier has changed from the previous flight identifier detected when the turnaround commenced. If the flight identifier has not changed, then the method 200 returns to block 224. However, if the flight identifier has changed, then the method 200 proceeds to block 236.

In block 236, in response to determining the flight identifier changed from the previous flight identifier detected when the turnaround commenced, the computing device 16 determines a status change timestamp when the flight identifier changed. The status change timestamp represents a position timestamp indicated by the aircraft location data when the flight identifier switched from the previous flight that was in progress when the turnaround commenced to the flight identifier indicated by the aircraft location data. The method 200 may then proceed to block 238.

In block 238, the computing device 16 determines if the aircraft 12 was idle during the status change timestamp. If the aircraft 12 was idle, then the method 200 proceed to block 246. However, if the aircraft 12 was not idle, then the method proceeds to block 240.

In block 240, in response to determining the aircraft 12 was not idle during the status change timestamp, the computing device 16 compares a current parking stand location, which is determined by the computing device 16 based on the geospatial data and the aircraft location data, with a location of the unique parking stand 24 that was recorded during the on-block time. The method 200 then proceeds to block 242.

In block 242, if the current parking stand location is different from the unique parking stand location that was recorded during the on-block time, the method may proceed to block 244. In block 244, the aircraft 12 completes the turnaround and the method 200 terminates, however, the system 10 does not determine the turnaround time. However, in response to determining the parking stand location matches the unique parking stand location recorded during the on-block time, the method 200 proceeds to block 246.

Figure 3D:
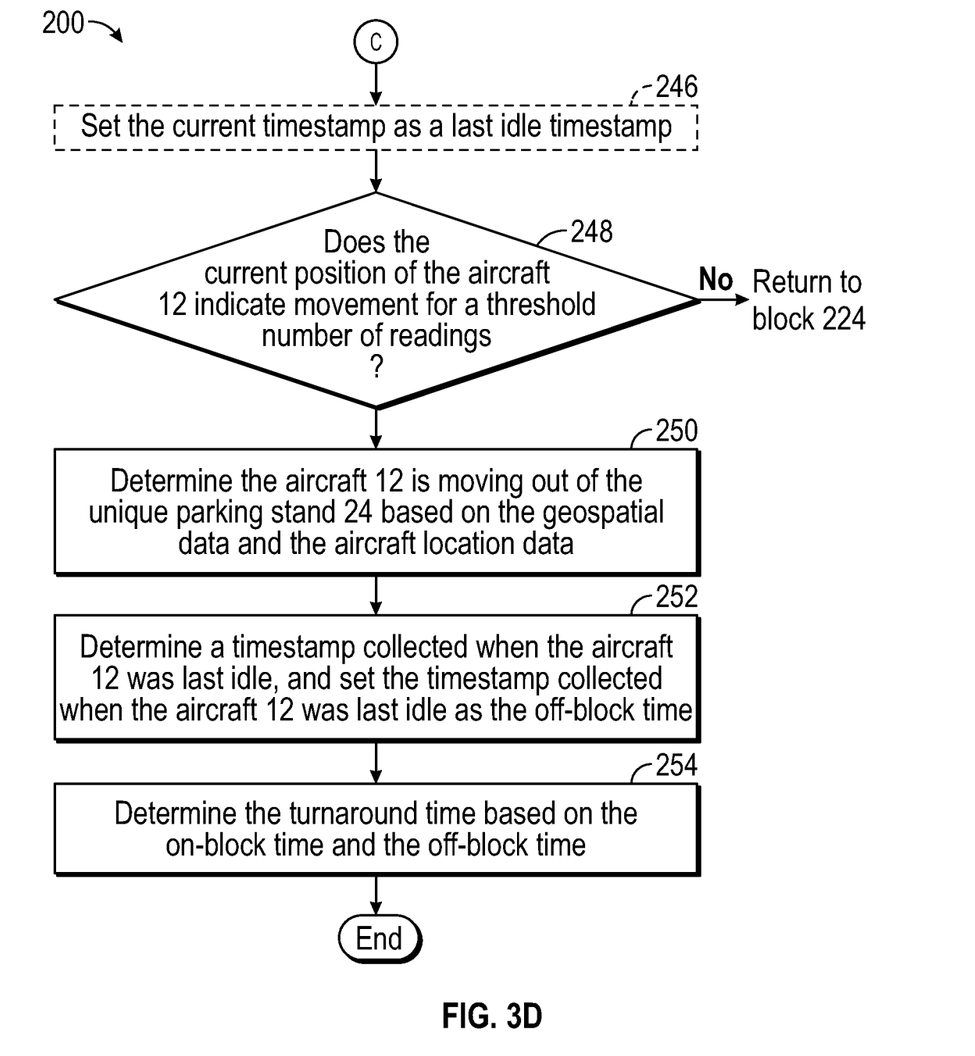

Referring to FIG. 3D, in block 246, the computing device 16 sets the current position timestamp as a last idle timestamp. The last idle timestamp represents the last timestamp that was recorded by the computing device 16 before the aircraft 12 ceased idling at the unique parking stand 24. The method 200 may then proceed to block 248.

In block 248, the computing device 16 determines if the current position of the aircraft 12 indicated by the aircraft location data indicates movement for a threshold number of readings. It is to be appreciated that the threshold number of readings indicate the aircraft 12 is exiting the unique parking stand 24. For example, in one embodiment, the threshold number of reading is three. In response to determining the current position of the aircraft 12 does not indicate movement for the threshold number of readings, the method returns back to block 224. However, in response to determining the current position of the aircraft 12 indicates movement for the threshold number of readings, then the method 200 proceeds to block 250.

In block 250, in response to determining the current position of the aircraft 12 indicates movement, the computing device 16 determines the aircraft 12 is moving out of the unique parking stand 24 based on the geospatial data and the aircraft location data. The method 200 may then proceed to block 252.

In block 252, in response to determining the aircraft 12 is moving out of the unique parking stand, the computing device 16 determines a position timestamp collected when the aircraft 12 was last idle. The computing device 16 then sets the position timestamp collected when the aircraft 12 was last idle as the off-block time of the turnaround. The method 200 may then proceed to block 254.

In block 254, the computing device 16 determines the turnaround time based on the on-block time and the off block time. Specifically, the turnaround time is calculated by measuring an amount of time that has elapsed from the on-block time to the off-block time. The method 200 may then terminate.

Referring generally to the figures, the present disclosure provides various technical effects and benefits for improving a system that determines the turnaround time of an aircraft. Specifically, the disclosed system provides a real-time cost-effective solution for monitoring the turnaround time of an aircraft without the need for manual supervision by fleet operators or other individuals. Furthermore, the disclosed system does not require specialized devices installed on the aircraft or any of the parking stands in order to determine the turnaround time, unlike some conventional approaches that are presently available. Furthermore, the disclosed system also ignores or filters poor quality data. It is to be appreciated that poor quality data may indicate that the aircraft is still moving when, in reality, the aircraft is idle. Additionally, the disclosed system also generates indicators that notify fleet operators when an on-going turnaround performed by the aircraft is taking too long or, alternatively, does not meet a target time. This in turn may lead to faster responses that aim to prevent or reduce scheduling delays that may be lengthen the turnaround time.

Figure 4:
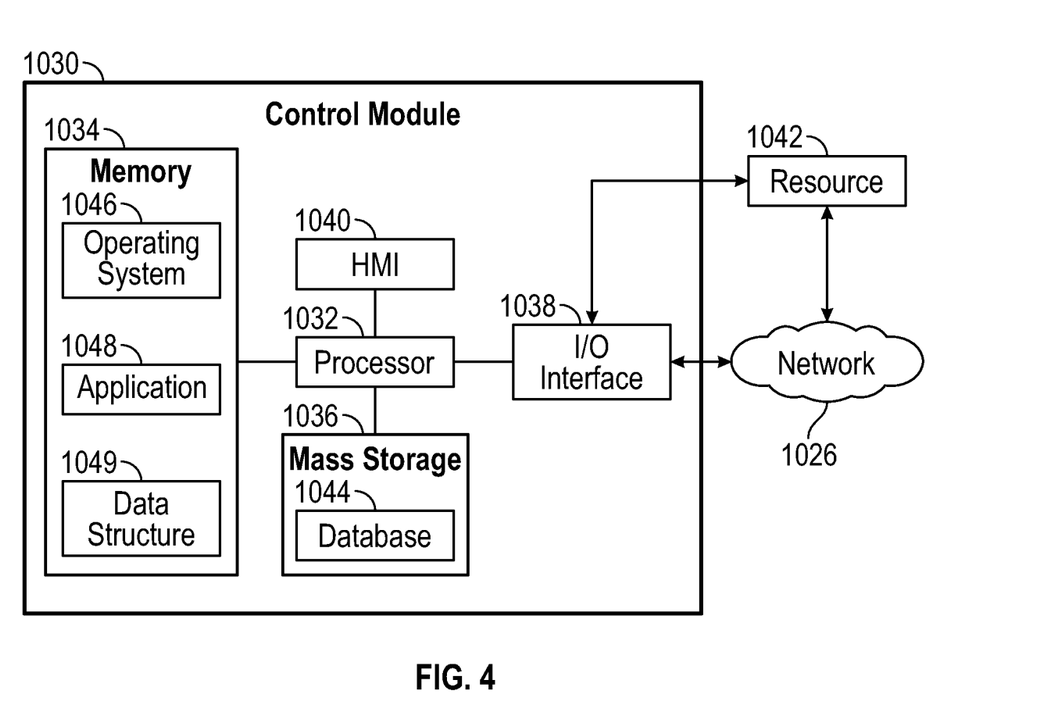
FIG. 4 illustrates a computing system for the disclosed system, according to an exemplary embodiment.

Referring to FIG. 4, the computing device 16 is implemented on one or more computer devices or systems, such as exemplary computer system 1030. The computer system 1030 includes a processor 1032, a memory 1034, a mass storage memory device 1036, an input/output (I/O) interface 1038, and a Human Machine Interface (HMI) 1040. The computer system 1030 is operatively coupled to one or more external resources 1042 via the network 1026 or I/O interface 1038. External resources may include, but are not limited to, servers, databases, mass storage devices, peripheral devices, cloud-based network services, or any other suitable computer resource that may be used by the computer system 1030.

The processor 1032 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. The mass storage memory device 1036 includes data storage devices such as a hard drive, optical drive, tape drive, volatile or non-volatile solid-state device, or any other device capable of storing information.

The processor 1032 operates under the control of an operating system 1046 that resides in memory 1034. The operating system 1046 manages computer resources so that computer program code embodied as one or more computer software applications, such as an application 1048 residing in memory 1034, may have instructions executed by the processor 1032. In an alternative example, the processor 1032 may execute the application 1048 directly, in which case the operating system 1046 may be omitted. One or more data structures 1049 also reside in memory 1034, and may be used by the processor 1032, operating system 1046, or application 1048 to store or manipulate data.

The I/O interface 1038 provides a machine interface that operatively couples the processor 1032 to other devices and systems, such as the network 1026 or external resource 1042. The application 1048 thereby works cooperatively with the network 1026 or external resource 1042 by communicating via the I/O interface 1038 to provide the various features, functions, applications, processes, or modules comprising examples of the disclosure. The application 1048 also includes program code that is executed by one or more external resources 1042, or otherwise rely on functions or signals provided by other system or network components external to the computer system 1030. Indeed, given the nearly endless hardware and software configurations possible, persons having ordinary skill in the art will understand that examples of the disclosure may include applications that are located externally to the computer system 1030, distributed among multiple computers or other external resources 1042, or provided by computing resources (hardware and software) that are provided as a service over the network 1026, such as a cloud computing service.

The HMI 1040 is operatively coupled to the processor 1032 of computer system 1030 in a known manner to allow a user to interact directly with the computer system 1030. The HMI 1040 may include video or alphanumeric displays, a touch screen, a speaker, and any other suitable audio and visual indicators capable of providing data to the user. The HMI 1040 also includes input devices and controls such as an alphanumeric keyboard, a pointing device, keypads, pushbuttons, control knobs, microphones, etc., capable of accepting commands or input from the user and transmitting the entered input to the processor 1032.

A database 1044 may reside on the mass storage memory device 1036 and may be used to collect and organize data used by the various systems and modules described herein. The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 1032 may be used to access the information or data stored in records of the database 1044 in response to a query, where a query may be dynamically determined and executed by the operating system 1046, other applications 1048, or one or more modules.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for determining a turnaround time for an aircraft at an airport, the system comprising:
   one or more processors;
   one or more geospatial databases storing geospatial data, wherein the geospatial data includes a plurality of spatial measurement sets corresponding to the airport where the aircraft is performing a turnaround, wherein each spatial measurement set indicates an area occupied by a unique parking stand of a plurality of unique parking stands at the airport, and wherein each spatial measurement set includes a plurality of points defining a polygon encompassing the area occupied by the unique parking stand;
   and
   a memory coupled to the one or more processors and the one or more geospatial databases, the memory storing data into a database and program code that, when executed by the one or more processors, causes the system to:
   repeatedly transmit an interrogation signal to a transponder of the aircraft, wherein the interrogation signal causes the transponder of the aircraft to automatically transmit a reply signal configured to be utilized to determine aircraft location data of the aircraft;
   receive and monitor a wireless data stream including the aircraft location data, wherein the aircraft location data includes at least a current position, a current altitude, a current velocity, and a current position timestamp of the aircraft;
   determine the aircraft is commencing the turnaround in response to the current altitude and the current position indicating the aircraft is on a ground, the current velocity being less than a threshold velocity, and the current position and the geospatial data indicating the aircraft is approaching a respective unique parking stand of the plurality of unique parking stands at the airport, wherein the turnaround occurs at the respective unique parking stand;
   determine the aircraft is idle based on the current position and the current velocity of the aircraft and determine the aircraft is located within the respective unique parking stand in response to the geospatial data and the aircraft location data indicating the aircraft is within the polygon encompassing the area occupied by the respective unique parking stand;
   in response to determining the aircraft is idle and is located within the area the respective unique parking stand, establishing an on-block time of the turnaround as the current position timestamp;
   after determining the on-block time, determine the aircraft is moving out of the respective unique parking stand based on the geospatial data and the aircraft location data;
   in response to determining the aircraft is moving out of the respective unique parking stand, determine a position timestamp when the aircraft was last idle; and
   set the position timestamp collected when the aircraft was last idle as an off-block time of the turnaround.

2. The system of claim 1, wherein the one or more processors execute instructions to:
   determine the turnaround time based on the on-block time and the off-block time.

3. The system of claim 1, wherein the aircraft location data further includes one or more of the following: a flight identifier, an origin airport code of the aircraft, and a destination airport code of the aircraft.

4. The system of claim 3, wherein the one or more processors execute instructions to:
   compare the destination airport code of the aircraft derived based on the aircraft location data with an actual airport code of the airport;
   determine the destination airport code matches the actual airport code; and in response to determining the destination airport code matches the actual airport code, monitor the current position and the current velocity of the aircraft.

5. The system of claim 3, wherein the one or more processors execute instructions to:
compare the destination airport code of the aircraft derived based on the aircraft location data with the actual airport code of the aircraft when the turnaround commenced; and
in response to determining the destination airport code of the aircraft derived based on the aircraft location data matches the actual airport code of the aircraft when the turnaround commenced, determine a previous flight identifier that was detected when the turnaround commenced.

6. The system of claim 3, wherein the one or more processors execute instructions to:
compare the flight identifier indicated by the aircraft location data with a previous flight identifier detected when the turnaround commenced;
determine the flight identifier has changed from the previous flight identifier detected when the turnaround commenced; and
in response to determining the flight identifier changed from the previous flight identifier detected when the turnaround commenced, determines a status change timestamp when the flight identifier changed.

7. The system of claim 6, wherein the status change timestamp represents a position timestamp indicated by the aircraft location data when the flight identifier switched from a previous flight that was in progress when the turnaround commenced to the flight identifier indicated by the aircraft location data.

8. The system of claim 6, wherein the one or more processors execute instructions to:
determine the aircraft was not idle during the status change timestamp;
in response to determining the aircraft was not idle during the status change timestamp, compare a current parking stand location with the unique parking stand location that was recorded during the on-block time;
determine the current parking stand location is different from the unique parking stand location that was recorded during the on-block time; and
in response to determining the current parking stand location matches the unique parking stand location that was recorded during the on-block time, set the current position timestamp as a last idle timestamp.

9. The system of claim 8, wherein the last idle timestamp represents a last timestamp that was recorded by the one or more processors before the aircraft ceased idling.

10. The system of claim 1, wherein the one or more processors execute instructions to:
determine the current position of the aircraft indicated by the aircraft location data indicates movement for a threshold number of readings, wherein the threshold number of readings indicate the aircraft is exiting the unique parking stand; and
in response to determining the current position of the aircraft indicates movement, determine the aircraft is moving out of the unique parking stand.

11. The system of claim 1, further comprising a notification system in electronic communication with the one or more processors, wherein the notification system generates one or more indicators.

12. The system of claim 11, wherein the one or more indicators are configured to inform individuals when an on-going turnaround performed by the aircraft exceeds a threshold period of time.

13. The system of claim 1, further comprising one or more historical computational databases for storing a plurality of turnaround records, wherein the one or more processors execute instructions to:
generate a turnaround record in response to determining the turnaround time, wherein the turnaround record indicates the turnaround time.

14. A method for determining a turnaround time of an aircraft at an airport, the method comprising:
repeatedly transmitting, by an interrogator, an interrogation signal to a transponder of the aircraft, wherein the interrogation signal causes the transponder to automatically transmit a reply signal configured to be utilized to determine aircraft location data of the aircraft;
receiving and monitoring, by a computing device, a wireless data stream indicating the aircraft location data, wherein the aircraft location data includes at least a current position, a current altitude, a current velocity, and a current position timestamp of the aircraft;
determining, by the computing device, the aircraft is commencing a turnaround in response to the current altitude and the current position indicating the aircraft is on a ground, the current velocity being less than a threshold velocity, and geospatial data and the current position indicating the aircraft is approaching a unique parking stand at the airport, wherein the turnaround occurs at a unique parking stand of a plurality of unique parking stands at the airport, and wherein the geospatial data includes a plurality of spatial measurement sets that correspond to the airport where the aircraft is performing the turnaround, wherein each spatial measurement set includes a plurality of points that cooperate to define a polygon encompassing an area occupied by a respective unique parking stand of the plurality of unique parking stands at the airport;
determining the aircraft is idle based on the current position and the current velocity of the aircraft and the aircraft is located within the unique parking stand in response to the geospatial data and the aircraft location data indicating the aircraft is within the polygon encompassing the area occupied by the unique parking stand;
in response to determining the aircraft is idle and is located within the area occupied by the unique parking stand is, establishing a current position timestamp as an on-block time of the turnaround;
after determining the on-block time, determining the aircraft is moving out of the unique parking stand based on the geospatial data and the aircraft location data;
in response to determining the aircraft is moving out of the unique parking stand, determining a position timestamp when the aircraft was last idle;
setting the position timestamp collected when the aircraft was last idle as an off-block time of the turnaround; and
determining the turnaround time based on the on-block time and the off-block time.

15. The method of claim 14, wherein the aircraft location data includes a destination airport code of the aircraft, and wherein the method further comprises:
comparing the destination airport code of the aircraft derived based on the aircraft location data with an actual airport code of the airport;

determining the destination airport code matches the actual airport code; and in response to determining the destination airport code matches the actual airport code, monitoring the current position the current velocity of the aircraft.

16. The method of claim 15, wherein the aircraft location data further includes a flight identifier, and wherein the method further comprises:

comparing the destination airport code of the aircraft derived based on the aircraft location data with the actual airport code of the aircraft when the turnaround commenced; and in response to determining the destination airport code of the aircraft derived based on the aircraft location data matches the actual airport code of the aircraft when the turnaround commenced, determining a previous flight identifier that was detected when the turnaround commenced.

17. The method of claim 15, wherein the aircraft location data further includes a flight identifier, and wherein the method further comprises:

comparing the flight identifier indicated by the aircraft location data with a previous flight identifier detected when the turnaround commenced;

determining the flight identifier has changed from the previous flight identifier detected when the turnaround commenced; and in response to determining the flight identifier changed from the previous flight identifier detected when the turnaround commenced, determining a status change timestamp when the flight identifier changed.

18. The method of claim 17, further comprising:

determining the aircraft was not idle during the status change timestamp;

in response to determining the aircraft was not idle during the status change timestamp, comparing a current parking stand location with the unique parking stand location that was recorded during the on-block time;

determining the current parking stand location is different from the unique parking stand location that was recorded during the on-block time; and in response to determining the current parking stand location matches the unique parking stand location that was recorded during the on-block time, setting the current position timestamp as a last idle timestamp.

19. The system of claim 1, further comprising a multilateration system including an interrogator, a plurality of signal receivers each disposed at a unique location, and a server, wherein the interrogator is configured to repeatedly transmit the interrogation signal, wherein each of the signal receivers is configured to receive one or more of the reply signals from the transponder, and wherein the server is configured to derive the aircraft location data based on the one or more of the reply signals received by each of the signal receivers and transmit the wireless data stream including the aircraft location data to the one or more processors.

20. The method of claim 14, further comprising:

after repeatedly transmitting the interrogation signal and prior to receiving and monitoring the wireless data stream, receiving one or more of the reply signals at each signal receiver of a plurality of signal receivers of a multilateration system, wherein each signal receiver is disposed at a unique location;

deriving the aircraft location data based on the one or more the reply signals received by each signal receiver; and transmitting the wireless data stream including the aircraft location data to the computing device.

* * * * *

UNITED STATES PATENT AND TRADEMARK OFFICE
CERTIFICATE OF CORRECTION

PATENT NO. : 12,354,037 B2
APPLICATION NO. : 17/498994
DATED : July 8, 2025
INVENTOR(S) : Dziecielski et al.

Page 1 of 1

It is certified that error appears in the above-identified patent and that said Letters Patent is hereby corrected as shown below:

In the Claims

Claim 1, Column 12, Line 41, "the area" should be omitted;

Claim 14, Column 14, Line 50, "stand is, establishing" should read --stand, establishing--.

Signed and Sealed this
Second Day of September, 2025

Coke Morgan Stewart
*Acting Director of the United States Patent and Trademark Office*